United States Patent
Bahlenberg et al.

(10) Patent No.: US 7,039,020 B1
(45) Date of Patent: May 2, 2006

(54) NEAR-ECHO SUPPRESSION

(75) Inventors: Gunnar Bahlenberg, Lulea (SE); Daniel Bengtsson, Lulea (SE); Siwert Hakansson, Jarfalla (SE); Anders Isaksson, Lulea (SE); Lars-Ake Isaksson, Lulea (SE); Mikael Isaksson, Lulea (SE); Magnus Johansson, Lulea (SE); Mauritz Lahti, Lulea (SE); Lis-Marie Ljunggren, Lulea (SE); Hans Lundberg, Lulea (SE); Tomas Nordstrom, Lulea (SE); Lennart Olsson, Lulea (SE); Sven-Rune Olofsson, Lulea (SE); Tomas Stefansson, Boden (SE); Hans Oman, Lulea (SE); Goran Okvist, Lulea (SE); Per Odling, Arnäsvall (SE); Petra Dentgen, Arnäsvall (SE); Franck Sjöberg, Lulea (SE)

(73) Assignee: STMicroelectronics N.V., Amsterdam (NL)

( * ) Notice: Subject to any disclaimer, the term of this patent is extended or adjusted under 35 U.S.C. 154(b) by 0 days.

(21) Appl. No.: 09/529,427

(22) PCT Filed: Oct. 27, 1998

(86) PCT No.: PCT/SE98/01931

§ 371 (c)(1),
(2), (4) Date: Nov. 1, 2000

(87) PCT Pub. No.: WO99/23763

PCT Pub. Date: May 14, 1999

(30) Foreign Application Priority Data

Nov. 3, 1997 (SE) .................................... 9704010

(51) Int. Cl.
*H04J 1/00* (2006.01)
(52) U.S. Cl. ........................ 370/281; 370/285; 370/402
(58) Field of Classification Search ................ 370/285, 370/290, 286, 281, 402; 379/402
See application file for complete search history.

(56) References Cited

U.S. PATENT DOCUMENTS

| 4,989,221 | A | * | 1/1991 | Qureshi et al. | ............. 375/222 |
| 5,305,379 | A | * | 4/1994 | Takeuchi et al. | ....... 379/406.06 |
| 5,479,503 | A | | 12/1995 | Fujiwara | |
| 5,627,863 | A | * | 5/1997 | Aslanis et al. | ............. 375/357 |
| 5,633,863 | A | | 5/1997 | Gysel et al. | |
| 5,917,809 | A | * | 6/1999 | Ribner et al. | ............... 370/286 |
| 6,333,920 | B1 | * | 12/2001 | Nguyen et al. | ............. 370/281 |

FOREIGN PATENT DOCUMENTS

DE        38 04 332        8/1989

\* cited by examiner

*Primary Examiner*—Chi Pham
*Assistant Examiner*—Blanche Wong
(74) *Attorney, Agent, or Firm*—Lisa K. Jorgenson; Allen, Dyer, Doppelt, Milbrath & Gilchrist, P.A.

(57) ABSTRACT

The hybrid circuit can be used to substantially reduce near echo signals. The circuit includes a balanced 2-wire to 4-wire hybrid for interconnecting a two wire receive path and a two wire transmit path to a two wire transmission line. The two wire receive path connects the balanced hybrid to an A/D converter and the two wire transmit path connects a D/A converter to the balanced hybrid. The two wire receive path contains a filter, dimensioned to remove signals transmitted from the D/A converter. The invention is particularly adapted for use with FDD and OFDD.

9 Claims, 1 Drawing Sheet

NEAR-ECHO SUPPRESSION

FIELD OF THE INVENTION

The present invention relates to duplex transmission systems and methods, and more particularly, to duplex transmission systems and methods including hybrid circuits to make 4-wire to 2-wire conversions.

BACKGROUND OF THE INVENTION

Hybrid balancing has been used for many years to make 4-wire to 2-wire conversions, and vice versa, for duplex systems using a single line. If the balance is less than ideal, a portion of the transmitted signal will leak through the hybrid circuit into the received signal path. This is referred to as near-echo. If the near-echo is strong, compared to the received signal, more bits are required in an Analog to Digital (A/D) converter located in the receive path. The present invention relates to a technique for substantially suppressing near-echo before A/D conversion in 2-wire to 4-wire hybrid circuit.

A hybrid circuit, of the type to which the present invention relates, may be used with the invention described in our co-pending Swedish patent application Kgp152/97, which relates to the application of the present invention to extending the reach of a VDSL.

SUMMARY OF THE INVENTION

According to a first aspect of the present invention, there is provided a hybrid circuit having a balance 2-wire to 4-wire hybrid for interconnecting a two wire receive path and a two wire transmit path to a two wire transmission line. The two wire receive path connects the balanced hybrid to an A/D converter and the two wire transmit path connects a D/A converter to the balanced hybrid. The two wire receive path includes a filter. The hybrid circuit may be adapted to operate with a transmission system using Frequency Divided Duplex (FDD), and the filter may be dimensioned to reject transmit signals originating from the D/A converter.

The hybrid circuit may be adapted to operate with a transmission system using Orthogonal Frequency Divided Duplex (OFDD), and the filter may be dimensioned to reject transmit sub-carriers originating from the D/A converter.

The hybrid circuit may be adapted to operate with a duplex system wherein all transmitters in ONUs and NTs in the duplex system are time synchronized, timing advance is calculated front line lengths, different sub-carriers are used for up-stream and down-stream transmissions, a cyclic prefix is added to compensate for delay propagation in transmission lines, and frequencies above the FDD band are not used for longer lines.

The cyclic prefix may be dimensioned for lines of length X and OFDD is used for lines shorter than X. The balanced hybrid and the filter, together, may introduce a delay less than a delay for which the cyclic prefix is dimensioned.

According to a second aspect of the present invention, there is provided a duplex transmission system including a plurality of the hybrid circuits.

DETAILED DESCRIPTION OF THE PREFERRED EMBODIMENTS

Figure 1:
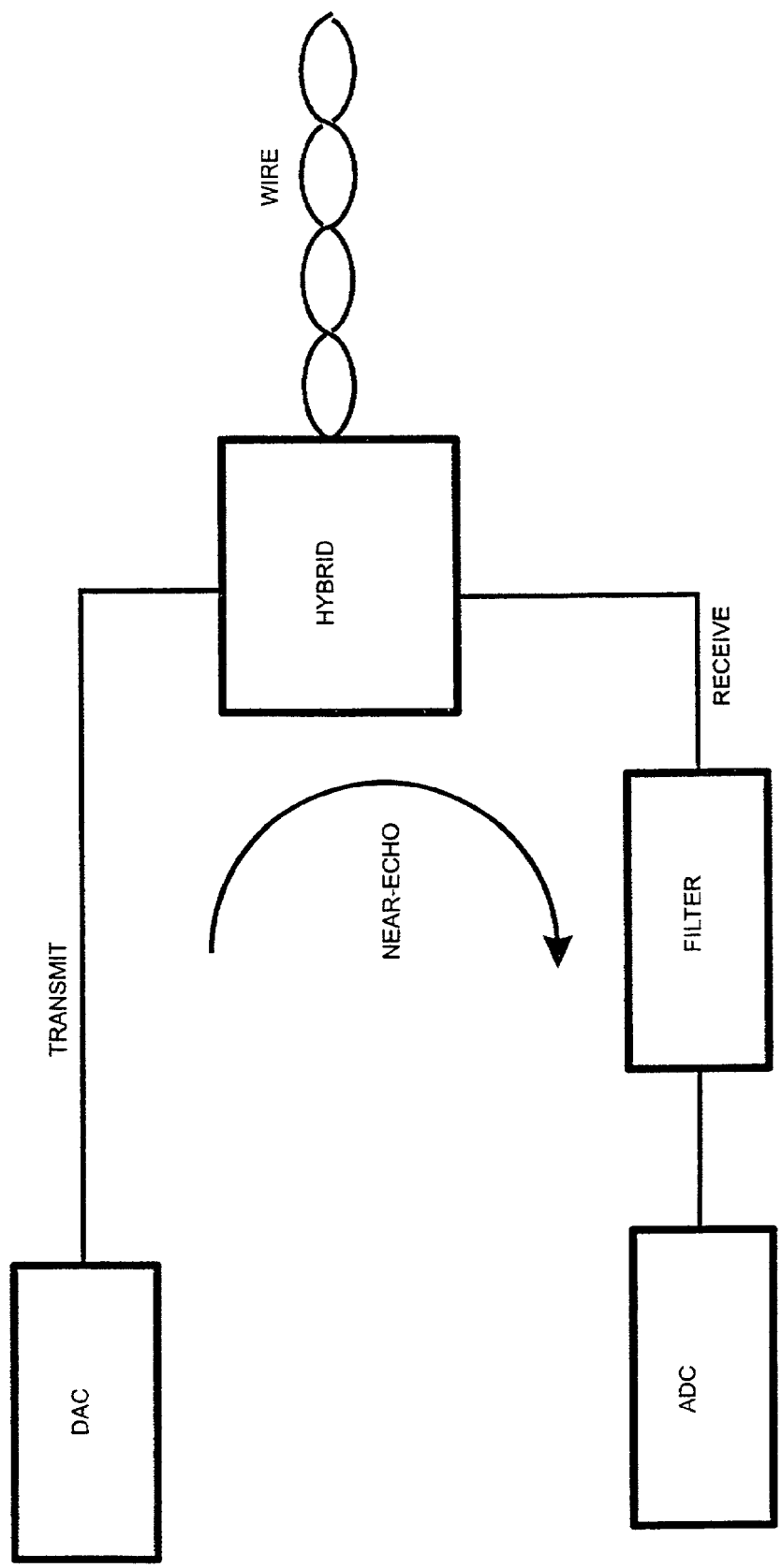
FIG. 1 is a schematic diagram illustrating a hybrid circuit according to the present invention.

The present invention will now be described more fully hereinafter with reference to the accompanying drawings in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

To facilitate an understanding of the present invention a glossary of terms used in the description of the present invention is provided below.
  A/D: Analog to Digital
  ADC: Analog to Digital Converter
  D/A: Digital to Analog
  DAC: Digital to Analog Converter
  DMT: Discrete Multi Tone
  FDD: Frequency Divided Duplex
  NT: Network Termination
  OFDD: Orthogonal Frequency Divided Duplex
  ONU: Optical Network Unit
  VDSL: Very high rate Digital Subscriber Line Where an A/D converter is located in the receive arm of a hybrid circuit, as illustrated in FIG. 1, the number of bits required in the A/D converter is determined from the input signal level. If the signal level is increased there will be a loss of resolution when the dynamic range is kept the same. If the near-echo is as strong as the received signal, the A/D converter will require one extra bit to maintain the same resolution. For long lines, the received signal will be more attenuated than for shorter lines. The near-echo will not be affected by the line length. This means that longer lines will be more affected by the near-echo signal.

The present invention is particularly applicable to reducing near-echo signal for the duplex scheme described in our co-pending patent Swedish application Kgp152/97, and DMT symmetric transmission systems of the type described in our patent application PCT/SE 9600935. The basic concept presented in the copending application is the use of Frequency Divided Duplex (FDD) for transmission at lower frequencies and Orthogonal Frequency Divided Duplex (OFDD), also known as Zipper, for transmission at higher frequencies. For long lines only, FDD is used for the lower frequencies (FDD). For short lines, an arbitrary up-/down-stream loading is possible for the higher frequencies. The key elements in the duplex scheme are: performance of time synchronization between all transmitters in the ONU and the NTs; calculation of timing advance from the line length; use of different sub-carriers in up-and down-stream directions; addition of an extension of the cyclic prefix to compensate for delay propagation in the line, this extra cyclic prefix is dimensioned for X meters, where X is the length of the shorter line; and not using the frequencies above the FDD band for lines longer than X meters, which means that FDD is used for longer lines and that OFDD can be used for lines less than X meters.

To suppress the near-echo signal before A/D conversion, a filter is inserted, see FIG. 1. This filter removes the transmitted signal in the FDD band described in our co-pending application, in which, where FDD is used, different frequency bands are used for up- and down-stream bands. This allows filters to be used to separate up-stream bands from down-stream bands. For the ONU side, it will be the FDD downstream band that is filtered out and, for the NT side, it will be the FDD upstream band that is removed.

For long lines, where only the lower frequencies are used, i.e. FDD is used, there is almost no near-echo because of the filter. For shorter lines, where higher frequencies are used, near-echo will be reduced. Suppressing near echo is more important for long lines where the received signal is more attenuated.

To fulfill the orthogonality requirements, the delay of the hybrid plus the filter must be less than the delay for which the extra cyclic prefix is dimensioned. By using the present invention: the number of bits required in the A/D converter, when OFDD is used, is reduced; and for longer lines, near-echo is better suppressed.

The term OFDD, as used in this specification, is intended to embrace similar duplex techniques, such as those employing DMT, wavelet multiplexing, or the like.

The invention claimed is:

1. A hybrid circuit for use with a duplex transmission system using Frequency Divided Duplex (FDD) and Orthogonal Frequency Divided Duplex (OFDD), for interconnecting a two wire receive path having an A/D converter and a two wire transmit path having a D/A converter to a two wire transmission line, the hybrid circuit comprising:
    a balanced 2-wire to 4-wire hybrid for interconnecting the two wire receive path and the two wire transmit path to the two wire transmission line; and
    a filter connected between the balanced hybrid and the A/D converter in the receive path to remove transmit signals originating from the D/A converter;
    wherein FDD is used for relatively longer transmission lines and OFDD is used for relatively shorter transmission lines.

2. A hybrid circuit according to claim 1, wherein the duplex transmission system includes all transmitters in Optical Network Units (ONUS) and Network Terminations (NTs) being time synchronized, timing advance for transmissions being calculated from line lengths, different subcarriers being used for up-stream and downstream transmissions, a cyclic prefix being added to transmissions to compensate for delay propagation in transmission lines, and frequencies above an FDD band are not used for longer lines.

3. A hybrid circuit according to claim 2, wherein the cyclic prefix is dimensioned for lines equal to and longer than length X and OFDD is used for lines shorter than length X.

4. A hybrid circuit according to claim 3 wherein the balanced hybrid and the filter, together, introduce a delay less than a delay for which the cyclic prefix is dimensioned.

5. A duplex transmission system comprising a plurality of hybrid circuits according to claim 1.

6. A hybrid circuit for use with a duplex transmission system using Frequency Divided Duplex (FDD) and Orthogonal Frequency Divided Duplex (OFDD), for interconnecting a receive path having an A/D converter and a transmit path having a D/A converter to a transmission line, the hybrid circuit comprising:
    a hybrid for interconnecting the receive path and the transmit path to the transmission line; and
    a filter connected between the hybrid and the A/D converter in the receive path to remove transmit signals originating from the D/A converter;
    wherein FDD is used for relatively longer transmission lines and OFDD is used for relatively shorter transmission lines.

7. A duplex transmission system comprising a plurality of hybrid circuits according to claim 6.

8. A method for interconnecting a receive path having an A/D converter and a transmit path having a D/A converter to a transmission line in a duplex transmission system using Frequency Divided Duplex (FDD) and Orthogonal Frequency Divided Duplex (OFDD), the method comprising:
    interconnecting the receive path and the transmit path to the transmission line with a hybrid; and
    removing transmit signals originating from the D/A converter with a filter connected between the hybrid and the A/D converter in the receive path;
    wherein FDD is used for relatively longer transmission lines and OFDD is used for relatively shorter transmission lines.

9. A method according to claim 8 wherein the hybrid comprises a balanced 2-wire to 4-wire hybrid for interconnecting a two wire receive path and a two wire transmit path to a two wire transmission line.

* * * * *